United States Patent [19]

Wium

[11] Patent Number: 4,467,136

[45] Date of Patent: Aug. 21, 1984

[54] DRAINABLE ENCLOSURE FOR EXPLOSION-PROOF ELECTRICAL SYSTEMS

[75] Inventor: Eigil Wium, Cheshire, Conn.

[73] Assignee: General Signal Corporation, Stamford, Conn.

[21] Appl. No.: 324,923

[22] Filed: Nov. 25, 1981

[51] Int. Cl.³ .............................................. H02G 3/04
[52] U.S. Cl. .................................. 174/50; 174/23 R; 285/150
[58] Field of Search ....................... 285/119, 150, 158; 174/50, 23 R

[56] References Cited

U.S. PATENT DOCUMENTS

| 2,227,954 | 1/1941 | Bissell | 174/23 R X |
| 2,402,840 | 6/1946 | Olley | 174/50 |
| 2,711,438 | 6/1955 | Bissell | 174/50 |
| 2,835,722 | 5/1958 | Appleton | 174/65 R X |
| 4,216,349 | 8/1980 | Wium | 174/50 |

*Primary Examiner*—Thomas F. Callaghan
*Attorney, Agent, or Firm*—Milton E. Kleinman; Martin LuKacher

[57] ABSTRACT

A hazardous location sealing fitting is provided with a multipart assembly so that the fill and drain opening may be maintained in a vertical orientation irrespective of the conduit orientation. The main body member comprises a "T" with a service port through which a fiber dam is placed to limit the volume of the sealing chamber. Subsequently, an auxiliary body member is coupled to the main body member at the service port. The auxiliary body member includes the fill and drain port together with a barrier dam and baffle for limiting the amount of sealing compound placed in the sealing chamber and directing the sealing compound into the sealing chamber, respectively. Because the main and auxiliary body members comprise separate parts, the fill port may be positioned with its axis in a vertical plane irrespective of the orientation of the axis of the conduit coupled to the main body member.

8 Claims, 3 Drawing Figures

DRAINABLE ENCLOSURE FOR EXPLOSION-PROOF ELECTRICAL SYSTEMS

BACKGROUND OF THE INVENTION AND PRIOR ART

It is well known that when an electrical circuit is broken, there is a tendency for a spark to occur. Many fires have been ignited unintentionally by an electrical spark occurring in an explosive atmosphere. That is, if the atmosphere in the vicinity of the spark should include more than a critical amount of explosive gases or vapors, an explosive and fire may result and possibly cause extensive damage or loss of life. Accordingly, precautions are customarily taken with electrical circuits in locations where an explosive atmosphere exists, or might exist. An explosion or a fire, once started, may travel through an electrical conduit, and/or an explosive atmosphere may enter an electrical conduit and be guided to a location where a spark might be generated. Accordingly, to avoid such transmission through conduits, it has become conventional, under selected circumstances, to provide barriers within the conduit. Examples of structures which provide barriers may be seen in U.S. Pat. Nos. 2,711,438; 2,835,722 and 4,216,349, issued June 21, 1955, to C. H. Bissell, May 20, 1958, to Arthur I. Appleton and Aug. 5, 1980 to Eigil Wium, respectively. As may be seen in these structures, a special fitting is used to join two sections of conduit, and a sealing compound is placed within a well, or chamber, in the fitting to provide a barrier.

Even in locations which are presumed to be dry it is not uncommon for water to form in the interior of the conduit. This is normally a result of a combination of the changes in atmospheric conditions, humidity, and/or temperature. As a result, outside air is drawn into the conduit system as it "breathes". If such air carries sufficient moisture, it may condense within the system when the temperature decreases and chills the air. The resultant water accumulation will remain within the conduit and more will be added thereto in response to repeated breathing cycles. A collection of such water can adversely affect the electrical circuit, and/or corrode the inferior of the conduit. Therefore, it has been found desirable to make a provision for draining water, or other liquids, that might otherwise collect in the sealed fitting. A simple opening to effect a drain would, obviously, defeat the purpose of the seal. Suitable drains have been devised which will permit the drainage of liquid from a sealed enclosure without adversely affecting the effectiveness of the seal for preventing the transmission of fire, explosions and/or explosive atmospheres. One form of suitable seal is disclosed in U.S. Pat. No. 2,405,927, issued Aug. 13, 1946, to N. A. Tornblom. A wide variety of drains for different types of applications have been developed. The drain, per se, does not form an integral part of this invention, except to the extent that the fitting must allow for the inclusion of one of the variety of drains available. Accordingly, it is believed that the disclosure of the details of any specific drain would only unnecessarily enlarge this specification and obscure the inventive concept.

Typical fittings, of the class described, usually include four ports, two of which provide means for coupling the fitting to conduit. Another port provides a means for connecting a suitable drain plug, and the last port provides a working access for the application of a suitable sealing compound within a well, or chamber, in the fitting. After the application of the sealing compound, a plug closes that access port. In typical prior art structures, care had to be exercised to avoid allowing the sealing compound to seal off the drain port. In some structures, a drain port plug was provided and removed after the hardening of the sealing compound. In other structures, a drain port plug and/or core was provided.

In some structures such plug or core was placed or removed through the access or working port and therefore sometimes inconvenienced the artisans working on the fitting and preparing it for receipt of the filling compound. The plug or core also tended to obscure vision, making it difficult to see inside the fitting and determine if the level of the sealing compound in the chamber was at an appropriate level. As a result, it was not unusual to have fittings with either over or underfill.

The structure disclosed in the last named patent obviated the need for a drain port plug or core; and, therefore, had no such device projecting into the working port to obstruct vision or working space. A feature of that structure resided in the fact that the upper limit of the drain port and the desired level of the sealing compound are coplanar. Accordingly, when liquid sealing compound was poured into the fitting through the working port, excess sealing compound could not remain within the fitting as it would overflow through the drain port. Another feature resided in the fact that the working port had no direct in-line communication with the drain port. Therefore, as sealing compound was poured into the fitting, it could not enter the drain port directly but had to flow into the sealing chamber. Accordingly, the artisan preparing the connection could pour sealing compound into the fitting through the working port until such time as an overflow came out through the drain port. The presence of overflow emerging from the drain port was evidence that there was not an underfill; and, because of the coplanar level of the upper limit of the drain port and the sealing chamber, there could be no overfill. When desired, a plug with a through passage could be placed in the drain port from the lower side to protect the threads of the drain port from contact with the sealing compound.

The fitting of U.S. Pat. No. 4,216,349 serves admirably when placed in a vertical position. However, the sealing material will not have a uniform depth when the fitting is used in a non-vertical position and cannot be used in a horizontal position. Further, the fitting of the cited patent is complex and specialized and therefore, relatively costly.

SUMMARY OF THE INVENTION

The structure disclosed herein is a more economical, efficient and convenient structure to use as the main body member comprises a simple "T" member to which a combined fill and drain member is coupled. The combined fill and drain member incorporates many of the features and advantages disclosed in the aforesaid U.S. Pat. No. 4,216,349 which was invented by the same inventor as the structure described herein. Of particular importance is the fact that the structure of the present invention is suitable for use in conduit systems installed with any angular orientation. The two part assembly permits a larger service port for inspection and placement of the fiber dam limiting the capacity of the sealing chamber. In addition, the two part assembly permits vertical orientation of the fill port irrespective of the angle of orientation of the main body member and the connecting conduit.

It is an object of the invention to provide a new and improved fitting for explosion-proof electrical systems.

It is a more specific object of the invention to provide a new and improved fitting for explosion-proof electrical systems having a drain port.

It is an even more specific object of the invention to provide a fitting of the class described wherein the angular orientation of the connecting conduit and that of the fill and drain port are independent.

It is another object of the invention to provide a fitting of the class described which provides a larger and more convenient service port.

It is another object of the invention to provide a two part assembly to permit changes in angular orientation of one part with respect to the other.

Still another object of the present invention is to provide a new and improved fitting of the character described which substantially overcomes the disadvantages of the prior art constructions and which provides a structure characterized by its reliability, ruggedness, ease and convenience of use, simplicity and low cost and high versitility and adaptability.

It will not be here attempted to set forth and enumerate all of the various objects and advantages incident to the invention, but other objects and advantages will be referred to, or else will become apparent from the description to follow.

BRIEF DESCRIPTION OF THE DRAWING

To permit an incisive and detailed analysis of the operational and construction characteristics of this invenion, various views and figures are provided. It should be understood that the drawing discloses one form of the invention and is not meant in any way to delimit its scope. It is rather so drawn as an aid in an understanding of the invention and various modifications will readily occur to one skilled in the appropriate arts. Like parts are given like reference numbers in all views.

DESCRIPTION OF THE PREFERRED EMBODIMENT

Figure 1:
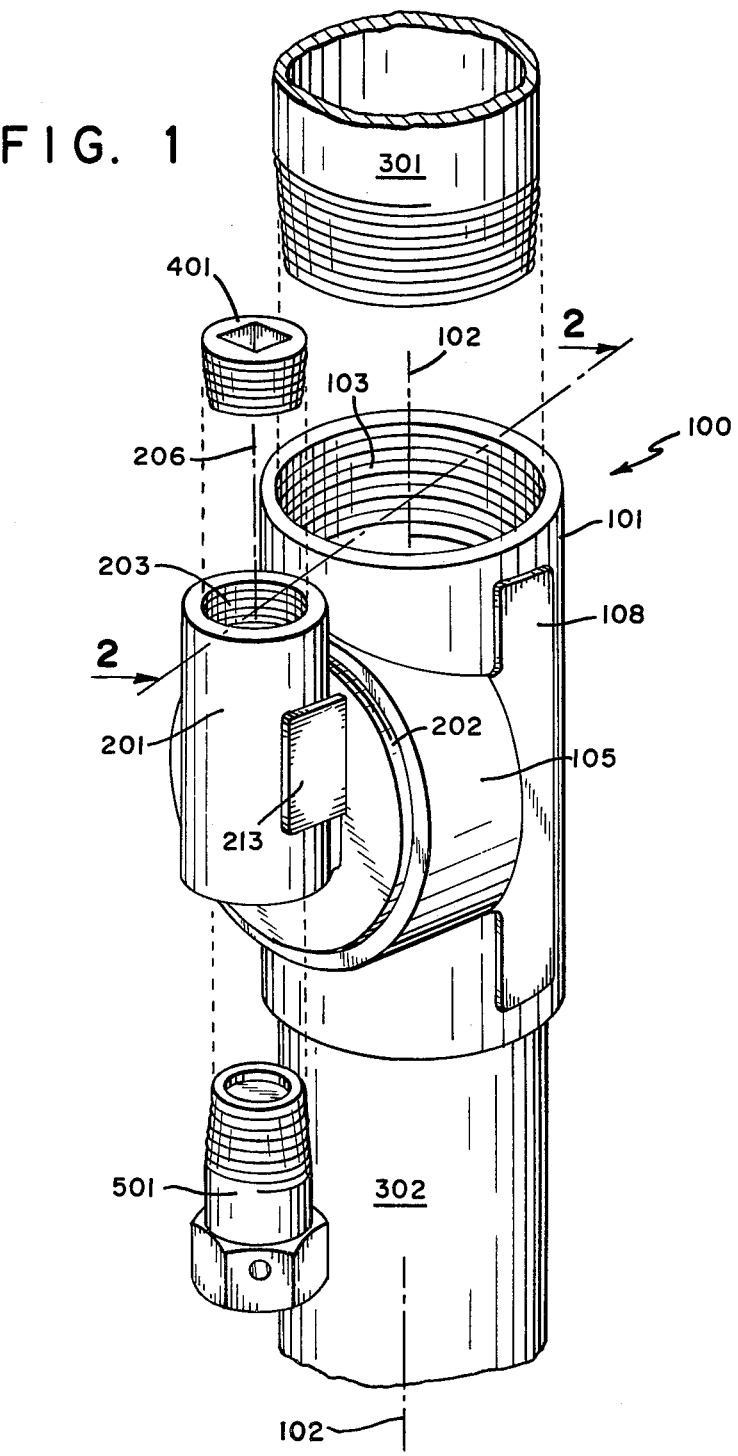
FIG. 1 comprises an isometric assembly drawing of the principal components of the structure.
Figure 3:
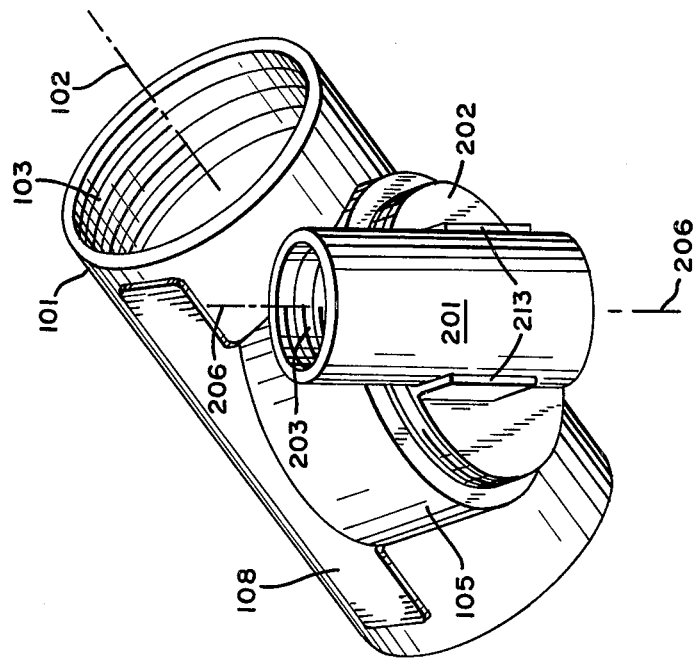
FIG. 3 is similar to FIG. 1 showing the principal components of the structure to illustrate alternate relative angular orientations of the respective parts.

Considering first FIG. 1, there will be seen an isometric and partially exploded view of a fitting which is suitable for use in a hazardous location and which allows a plurality of relative orientations of the conduit with respect to the fill port. The fitting is indicated generally as 100 and comprises a main body member 101 and an auxiliary body member 201. The main body member 101 may be threadingly or otherwise coupled to conduit 301 and 302. A plug 401 and a drain member 501 may be threadingly engaged with the auxiliary body member 201.

Figure 2:
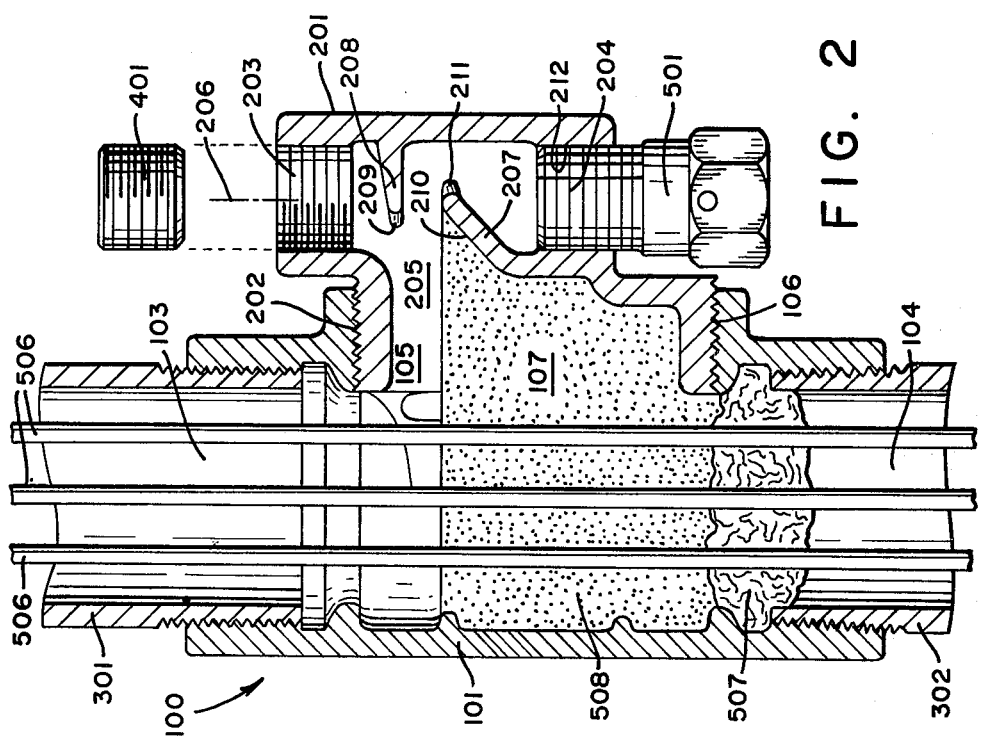
FIG. 2 comprises a cross section of FIG. 1 taken along the line 2—2.

FIG. 2 comprises a cross section view of the fitting 100 taken through a plane including the line 2—2 and the axis 206 of the main body member 101.

As may be seen in these figures, the main body member 101 includes an entrance port 103, an exit port 104 and a service port 105. Each of the ports 103, 104 and 105 are internally threaded. However, it will be apparent that other coupling methods such as flanges and bolts (not shown) could be used. As will be seen, the main body member 101 comprises a "T" member the interior of which is hollow so that there are connecting passageways between all of the ports. Normally, the entrance port 103 and the exit port 104 will be of the same size. The service port 105 is usually made as large as practical in view of the other dimensions of the main body member 101. This is a matter of convenience and there is usually no specific requirement concerning the relative size of the service port 105 with respect to the entrance and exit ports 103 and 104.

Those familiar with fittings of the character described know that they are used to prevent the passage of any gas from one side of the fitting to the other and/or to prevent the propagation of fire or explosion. In order to provide the gas tight character of the fitting 101, it is necessary to provide a sealing material within the fitting 100. The various members of the fitting to be described hereinafter are designed to facility assembly of the fitting 101 and the installation of a suitable sealing compound therein.

As seen in FIG. 2, the fitting 100 including the main body member 101 is assembled with conduit 301 and 302 and wires 506 are drawn therethrough. The number and size of wires 506 which are used depend upon requirements which are independent of the fitting 100 except that, in accordance with established codes, the wires 506 must not occupy more than a predetermined cross sectional area of the interior of the conduits 301 or 302 and/or the main body member 101. Fittings 100 may be manufactured in a wide variety of sizes in order to accomodate the varying needs of the industry.

At this stage of the assembly, with the conduits 301 and 302 connected to the main body member 101 and with the wires 506 drawn therethrough, the auxiliary body member 201 is removed if it had been coupled to the main body member 101. Without the auxiliary body member 201 coupled to the main body member 101, there will be exposed the service port 105 through which an examination may be made of the interior of the body member 101 and of the wires 506 passing through the body member 101 from the entrance port 103 to the exit port 104. Through the service port 105 fiber dam material 507 is inserted in a prescribed manner to fit between and around each of the wires 506 and serve as a lower boundary limit for a sealing chamber 107 and thereby limit the extent of the flow of the sealing compound 508 which is subsequently placed in the sealing chamber 107 in the interior of the fitting 100.

If the fitting 100 is to be used in a location wherein the angular orientation of the axis of conduits 301 and/or 302 differs substantially from vertical, a fiber dam (not shown) but similar to fiber dam 507 will be inserted within the interior of the fitting 100 in the area of the junction between the conduit 301 and the main body member 101.

Subsequent to the placement of the fiber dam material 507 and an inspection to assure that the wires 506 are appropriately separated one from the other and from the conduit 301 and/or 302, the auxiliary body member 201 is coupled to the main body member 101 by mating the threads 202 of the auxiliary body member 201 with the threads 106 of the main body member 101. It should be understood that all threaded connections of the fitting are designed to inhibit the passage of any liquid or gas therethrough when properly assembled. Typically tapered threads are used. Where appropriate, compound and/or other techniques may be used. As already suggested, the members 101 and 201 may be coupled by any other suitable means provided only that the joint conforms with applicable code requirements. The use of a flange and bolts to couple the auxiliary body member 201 to the main body member 101 could provide a smaller assembly if space utilization is important.

The auxiliary body member 201 may be seen to include a fill port 203 and a drain port 204. In addition, the auxiliary body member includes a coupling port 205 and there are connecting passageways between the ports 203, 204 and 205. The coupling port 205 connects with the service port 105 when the members 101 and 201 are threadingly engaged. Accordingly, there is a passageway from the fill port 203 through the coupling port 205 and the service port 105 to the interior of the main body member 101 and the sealing chamber 107.

As the auxiliary body member 201 is coupled with the main body member 101, care should be exercised to assure that in the final assembly, the orientation of the auxiliary body member 201 is such that the axis 206 of the fill port 203 is in a substantially vertical plane. One will be able to readily visualize that this requirement can be met irrespective of the angular orientation of the axis of conduits 301 and/or 302 if the main body member 101 is positioned around its axis 206 in an appropriate manner.

As seen most clearly in FIG. 2, the interior of the auxiliary body member 201 includes a barrier dam 207 and a baffle 208. It will be seen that the orientation and proportions of the barrier dam 207 and the baffle 208 are such that there is not a straight line passageway from the fill port 203 to the drain port 204 and even more specifically, the tip 209 of the baffle 208 extends leftward, as seen in FIG. 2, of the uppermost right hand interior limit 210 of the barrier dam 207. With the described relationship between the baffle 208 and the barrier dam 207, it will be apparent that any liquid compound poured into the fill port 203 will flow into the sealing chamber 107 which is illustrated as filled by the sealing compound 508.

When the assembly is complete as shown in FIG. 2 but with the drain seal 501 removed, sealing compound in liquid form will be poured into the fill port 203 and will enter the interior of the main body member 101 assuming the position indicated by the sealing compound 508. The fiber dam 507 prevents the sealing compound 508 from penetrating through to the conduit 302. The sealing compound 508 is poured into the fill port 203 in liquid form but has a chemical composition which causes it to harden and solidify in a relatively short time. The lip 211 of the barrier dam 207 is substantially horizontal or possibly includes a drain notch. When an amount of sealing compound 508 has been poured into the fill port 203 to provide the necessary fill any excess sealing compound 508 will rise above the level of the lip 211 and exit through the drain port 204. The initiation of emergence of sealing compound 508 through the drain port 204 is a visual indication to the craftsman that an adequate amount of sealing compound has been placed in the sealing chamber 107 the volume of which is coincident with that occupied by the sealing compound 508. If it is desired to do so, the threads 212 at the drain port 204 may be protected from contamination by the sealing compound 508 by the placement of a temporary sleeve or nipple (not shown) in the manner familiar to those acquainted with this art.

In the event that the fitting 100 is to be used in a location wherein the orientation of the axis 102 joining the entrance and exit ports 103 and 104, respectively, differs substantially from vertical it may, as has already been mentioned, be necessary to provide a fiber dam similar to the fiber dam 507 at the junction between the conduit 301 and the body member 101.

After the sealing compound 508 has been positioned and hardened, the plug 401 and drain plug 501 may be assembled to the auxiliary body member 201.

Although it is customary for the entrance and exit ports 103 and 104 to be in linear alignment, it will be obvious that other configurations could be provided.

As previously set forth, the drain 501 provides a path to allow any condensate which may accumulate above the sealing compound 508 to flow over the lip 211 and pass through the drain 501. The drain 501 does not comprise a portion of this invention and therefore is not described in detail. A typical drain may be seen in the cited U.S. Pat. No. 2,405,927 and serves to permit the drainage of liquid from the system and still serves as a flame stop to prevent any fire, internal to the system, from igniting any possible gas which could be present exterior of the conduit 103. For systems wherein the conduit 301 is horizontal the drain 501 would not serve to drain condensate accumulating in the conduit 301 and an alternate drainage system would be necessary.

If the conduit 302 extends into an atmosphere which may include combustible gases, the fitting 100 seals such combustible gases within the interior of the conduit 302 and prevents the passage of such gas through the fitting 100 to the conduit 301. Thus the fitting 100 serves to isolate two different atmospheres and prevent the passage of gas from one to the other. It should be understood that the conduit 301 or 302 may, and quite often does, include an explosive gas or vapor and that the gas or vapor may be ignited by a sparking or arcing device in an enclosure to which the conduit is connected. The explosion proof structure, described herein, contains or limits the explosion and prevents the propagation of hot gasses or flames outside the structure where it might ignite an ambient explosive atmosphere.

The flat 108 and a corresponding flat diametrically opposed thereto provides a means for grasping the body member 101 with a suitable wrench for initiating or inhibiting rotation thereof about the axis 102. In a similar manner, the flat 213 on auxiliary body member 201 provides a means for connecting a wrench for turning the body member 201 to a desired orientation.

While there has been shown and described what is considered at present to be the preferred embodiment of the invention, modifications thereto will readily occur to those skilled in the related arts. For example, in another structure various proportions and/or orientations might vary. Or the baffle 208 might be planar or include a spout. It is believed that no further analysis or description is required and that the foregoing so fully reveals the gist of the present invention that those skilled in the applicable arts can adapt it to meet the exigencies of their specific requirements. It is not desired, therefore, that the invention be limited to the embodiments shown and described, and it is intended to cover in the appended claims all such modifications as fall within the true spirit and scope of the invention.

What is claimed is:

1. A fitting for explosion-proofing electrical conduits which comprises a main body having a passage therethrough for wires between an entry port and an exit port at opposite ends of said main body, said entry and exit ports providing connections to said conduits, said passage having a generally circular cross section of a first diameter, said main body having a service port through the side thereof of a second diameter larger than said first diameter, an auxiliary body member having a coupling port rotatably attachable to said service port, said coupling port having a passage therethrough, said auxiliary body member also having a fill port and a drain port with passages therethrough which are in alignment with each other and which intersect the passage through said coupling port, said auxiliary body member also having a barrier dam connecting to said drain port and extending in a first direction toward said fill port partially across said coupling port passage, said barrier dam also extending across said coupling port passage in a second direction transverse to said first direction partially closing said coupling port passage, said barrier dam having a lip disposed between the fill port passage and the drain port passage and also extending in said second direction across said coupling port passage, the distance across said coupling port passage in said first direction closed by said barrier dam and said auxiliary body member to the lip of said barrier dam being longer than said first diameter to define a sealing chamber with the surfaces of the passage in said main body between said entry and exit ports, and a body of dam material across said main body passage at the exit port end thereof said sealing chamber being entirely fillable with sealing compound introduced through said fill port regardless of the angular orientation of said main body and the passage there through with respect to the vertical.

2. The fitting according to claim 1 wherein said auxiliary body is rotatably mounted in said main body service port with the axis of the passage through said fill port vertical regardless of the deviation of the passage between the exit and entry ports of said main body from the vertical.

3. The fitting according to claim 2 wherein said coupling port and service port have interengaging threads which rotatably attach said main body and auxiliary body to each other.

4. The fitting according to claim 1 wherein said main body is a "T" member with the passage between said exit and entry ports perpendicular to the passage through said service port, and said auxiliary member is also a "T" member with the aligned passages through said fill and drain ports perpendicular to the passage through coupling port thereof.

5. The fitting according to claim 1 wherein said auxiliary body has a baffle extending in an opposite direction to said lip over said lip for diverting the sealing compound introduced through said fill port into said sealing chamber.

6. The fitting as set for in claim 1 wherein a second boundary of said sealing chamber is located in said main body passage at said entry port for receiving a second body of dam material to define a second dam across said main body passage.

7. The fitting as set forth in claim 1 wherein said service port provides access means for placement of said dam material prior to the coupling of said main and auxiliary bodies.

8. The fitting as set forth in claim 5 wherein said baffle has a downward slope toward said lip.

* * * * *